(12) United States Patent
Takeya et al.

(10) Patent No.: US 10,155,521 B2
(45) Date of Patent: Dec. 18, 2018

(54) VEHICLE CONTROL DEVICE

(71) Applicant: ADVICS CO., LTD., Kariya-shi, Aichi-ken (JP)

(72) Inventors: Yusuke Takeya, Miyoshi (JP); Toshihisa Kato, Handa (JP)

(73) Assignee: ADVICS CO., LTD., Kariya-Shi, Aichi-Ken (JP)

( * ) Notice: Subject to any disclaimer, the term of this patent is extended or adjusted under 35 U.S.C. 154(b) by 0 days.

(21) Appl. No.: 15/542,556

(22) PCT Filed: Jan. 29, 2016

(86) PCT No.: PCT/JP2016/052628
§ 371 (c)(1),
(2) Date: Jul. 10, 2017

(87) PCT Pub. No.: WO2016/121920
PCT Pub. Date: Aug. 4, 2016

(65) Prior Publication Data
US 2017/0361851 A1   Dec. 21, 2017

(30) Foreign Application Priority Data

Jan. 30, 2015 (JP) ................ 2015-017981

(51) Int. Cl.
*B60W 30/18* (2012.01)
*B60T 7/12* (2006.01)
(Continued)

(52) U.S. Cl.
CPC ......... *B60W 30/18181* (2013.01); *B60T 7/04* (2013.01); *B60T 7/12* (2013.01);
(Continued)

(58) Field of Classification Search
CPC ........... B60W 30/18181; B60W 10/04; B60W 10/30; B60W 10/18; B60W 10/22;
(Continued)

(56) References Cited

U.S. PATENT DOCUMENTS

2006/0097570 A1*  5/2006  Doerr ................. B60Q 1/44
303/193

FOREIGN PATENT DOCUMENTS

JP   62-34809 A   2/1987
JP    5-42861 A   2/1993
(Continued)

OTHER PUBLICATIONS

International Search Report (PCT/ISA/210) dated Apr. 5, 2016, by the Japanese Patent Office as the International Searching Authority for International Application No. PCT/JP2016/052628.
(Continued)

*Primary Examiner* — Yuen H Wong
(74) *Attorney, Agent, or Firm* — Buchanan Ingersoll & Rooney PC

(57) ABSTRACT

This vehicle control device is provided with: a control unit for executing one-pedal control, that is, the control for accelerating a vehicle when a single pedal is depressed from a predetermined reference point of a pedal stroke, and for decelerating the vehicle when the pedal is released from the reference point; and a determination unit for determining whether or not a rate of change in a pedal operation amount when the pedal is released is equal to or greater than a first threshold value. The control unit performs control for increasing a braking force when the rate of change is equal to or greater than the first threshold value.

13 Claims, 9 Drawing Sheets

(51) Int. Cl.
  *F16F 9/50* (2006.01)
  *B60T 7/04* (2006.01)
  *G05G 1/30* (2008.04)
  *B60W 10/04* (2006.01)
  *B60W 10/18* (2012.01)
  *B60W 10/22* (2006.01)
  *B60W 10/30* (2006.01)

(52) U.S. Cl.
  CPC ............ *B60W 10/04* (2013.01); *B60W 10/18* (2013.01); *B60W 10/22* (2013.01); *B60W 10/30* (2013.01); *F16F 9/50* (2013.01); *G05G 1/30* (2013.01); *B60T 2201/03* (2013.01); *B60T 2220/04* (2013.01); *B60W 2540/106* (2013.01); *B60W 2710/09* (2013.01); *B60W 2710/18* (2013.01); *B60W 2710/226* (2013.01); *B60W 2720/106* (2013.01)

(58) Field of Classification Search
  CPC ......... B60W 2710/09; B60W 2710/18; B60W 2540/106; B60W 2720/106; B60W 2710/226; B60T 7/04; B60T 7/12; B60T 2201/03; B60T 2220/04; G05G 1/30; F16F 9/50
  See application file for complete search history.

(56) References Cited

FOREIGN PATENT DOCUMENTS

| JP | 09-095222 A | 4/1997 |
|---|---|---|
| JP | 2001-219831 A | 8/2001 |
| JP | 2006-500270 A | 1/2006 |

OTHER PUBLICATIONS

Written Opinion (PCT/ISA/237) dated Apr. 5, 2016, by the Japanese Patent Office as the International Searching Authority for International Application No. PCT/ JP2016/052628.

* cited by examiner

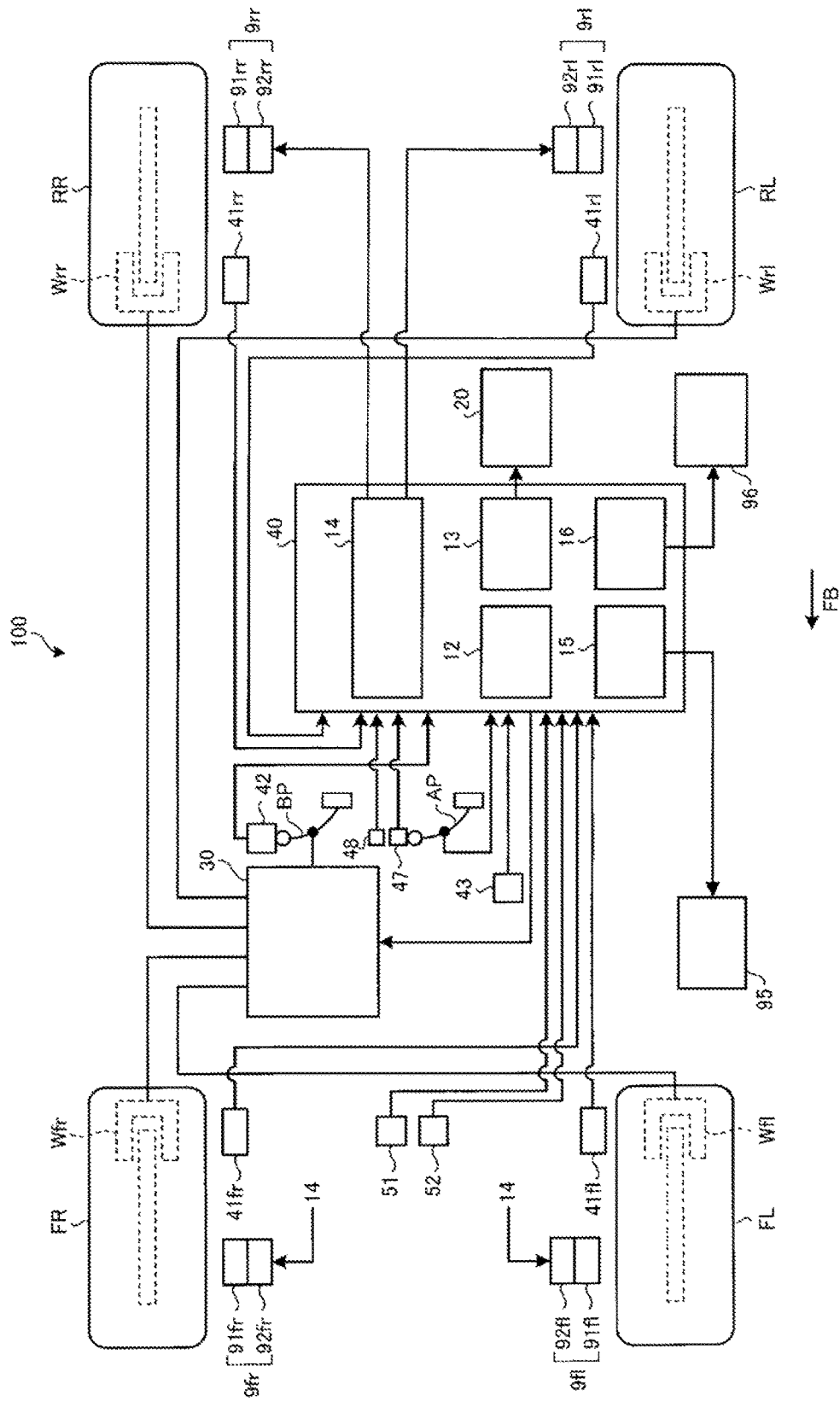

[FIG.1B]

| | |
|---|---|
| 12 | BRAKE ECU |
| 13 | ENGINE ECU |
| 14 | SUSPENSION ECU |
| 15 | OUTPUT CONTROL UNIT |
| 16 | LIGHTNING CONTROL UNIT |
| 20 | ENGINE |
| 30 | BRAKE CONTROL UNIT |
| 40 | CONTROL DEVICE |
| 95 | LOUDSPEAKER |
| 96 | HAZARD LAMP |

[FIG.2]
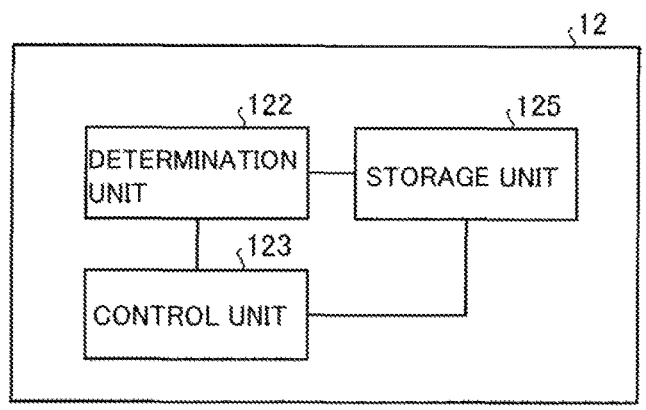
[FIG.3]
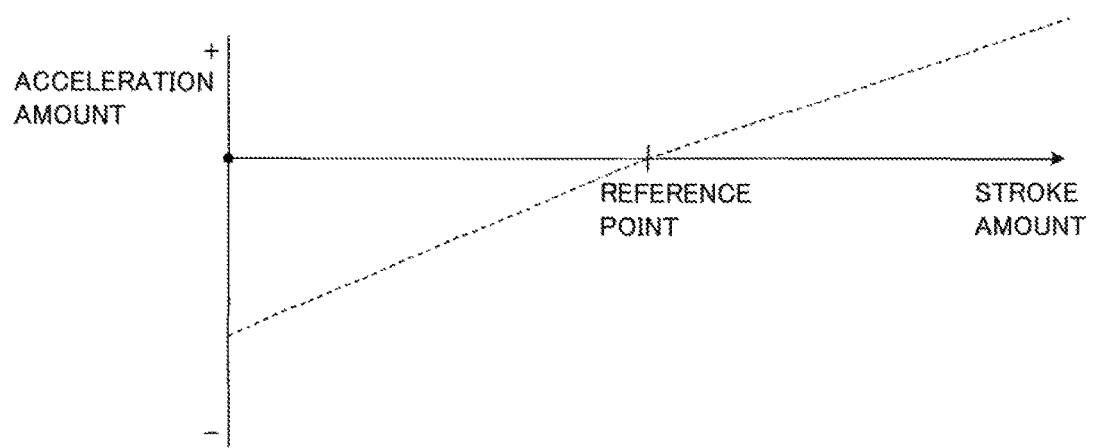

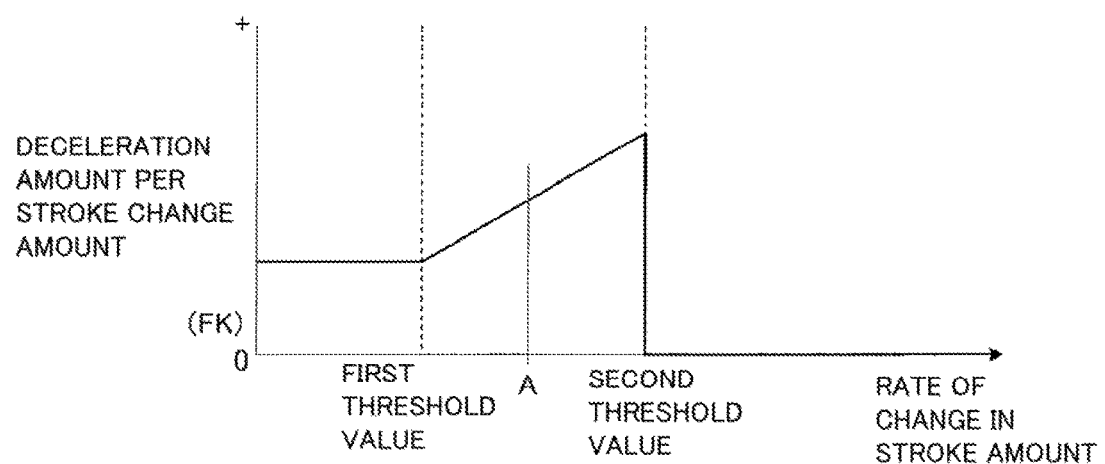
[FIG.4]

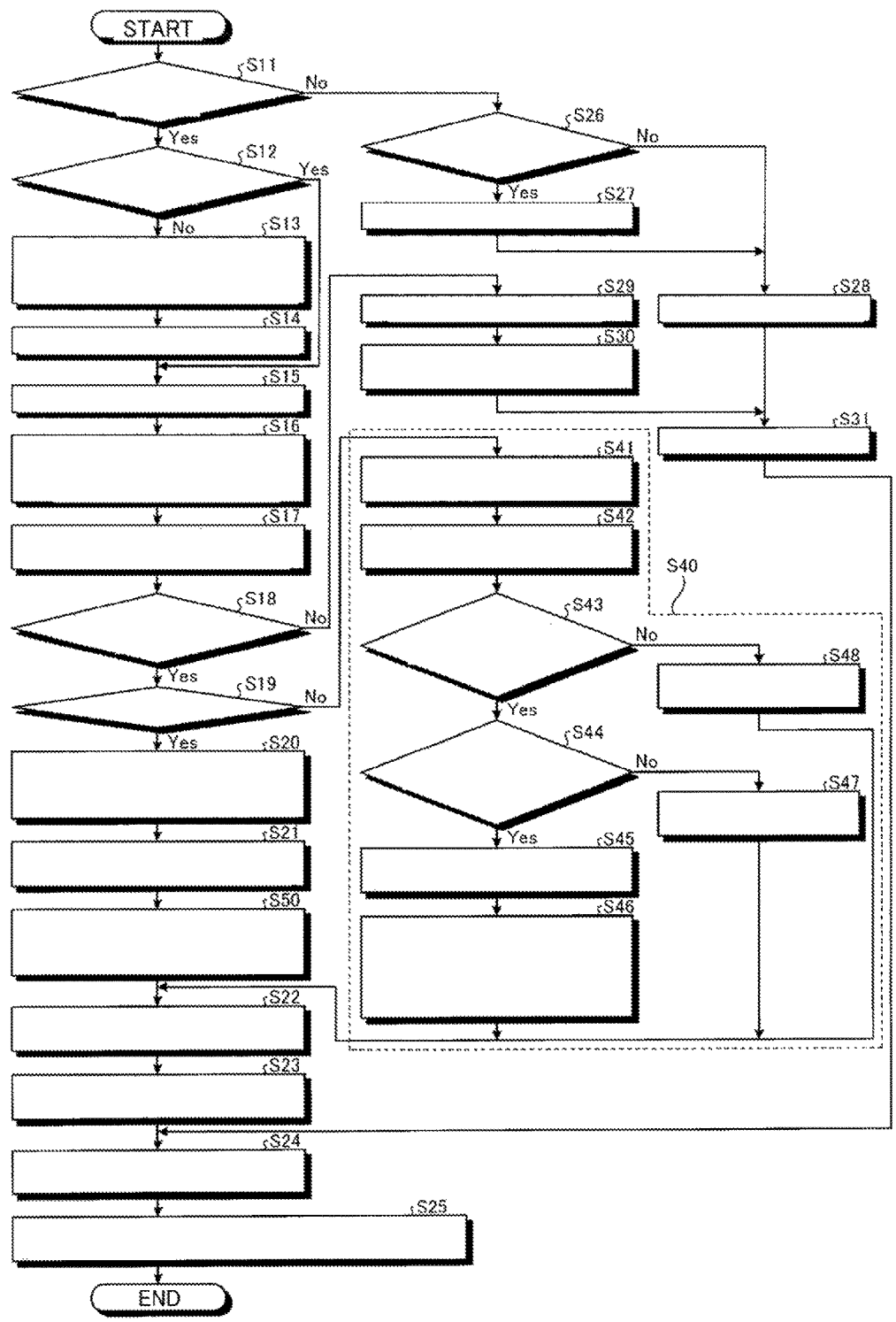
[FIG.5A]

[FIG.5B]

| | |
|---|---|
| S11 | IN-ONE-PEDAL-CONTROL? |
| S12 | IN PREVIOUS ONE-PEDAL-CONTROL? |
| S13 | PREVIOUS TARGET DECELERATION AMOUNT = START DECELERATION AMOUNT<br>PREVIOUS STROKE AMOUNT = START STROKE AMOUNT |
| S14 | START ANNOUNCEMENT OUTPUT |
| S15 | ACQUIRE CURRENT STROKE AMOUNT |
| S16 | STROKE CHANGE AMOUNT = PREVIOUS STROKE AMOUNT − CURRENT STROKE AMOUNT |
| S17 | RATE OF CHANGE IN STROKE = STROKE CHANGE AMOUNT/ARITHMETIC OPERATION CYCLE |
| S18 | CURRENT STROKE AMOUNT $\leq$ REFERENCE POINT? |
| S19 | IN PEDAL-RETURNING? |
| S20 | CALCULATE DECELERATION AMOUNT (FK) PER STROKE CHANGE AMOUNT FROM RATE OF CHANGE IN STROKE |
| S21 | ADDITIONAL DECELERATION AMOUNT = (FK*STROKE CHANGE AMOUNT) |
| S22 | OUTPUT BRAKING FORCE DEPENDING ON CURRENT TARGET DECELERATION AMOUNT |
| S23 | CALCULATE AND OUTPUT DECELERATION FORCE DEPENDING ON DECELERATION AMOUNT |
| S24 | PREVIOUS TARGET DECELERATION AMOUNT ← CURRENT TARGET DECELERATION AMOUNT |
| S25 | PREVIOUS STROKE AMOUNT ← CURRENT STROKE AMOUNT<br>PREVIOUS IN-ONE-PEDAL-CONTROL ← CURRENT IN-ONE-PEDAL-CONTROL |
| S26 | IN PREVIOUS ONE-PEDAL-CONTROL? |
| S27 | END ANNOUNCEMENT OUTPUT |
| S28 | ACQUIRE CURRENT STROKE AMOUNT |
| S29 | CONTROL ON ACCELERATION SIDE |
| S30 | CALCULATE AND OUTPUT DAMPING FORCE DEPENDING ON ACCELERATION AMOUNT |
| S31 | CURRENT TARGET DECELERATION AMOUNT = 0 |
| S40 | CALCULATE BRAKING FORCE ON STEPPING-ON SIDE |
| S41 | CALCULATE CURRENT REFERENCE DECELERATION AMOUNT FROM CURRENT STROKE AMOUNT |
| S42 | CALCULATE PREVIOUS REFERENCE DECELERATION AMOUNT FROM PREVIOUS STROKE AMOUNT |
| S43 | CURRENT REFERENCE DECELERATION AMOUNT $\leq$ PREVIOUS TARGET DECELERATION AMOUNT |
| S44 | PREVIOUS REFERENCE DECELERATION AMOUNT < PREVIOUS TARGET DECELERATION AMOUNT? |
| S45 | STROKE REFERENCE DECELERATION AMOUNT = \| REFERENCE POINT − PREVIOUS STROKE AMOUNT \| |
| S46 | CURRENT TARGET DECELERATION AMOUNT = \| PREVIOUS TARGET DECELERATION AMOUNT − ((PREVIOUS TARGET DECELERATION AMOUNT/STROKE REFERENCE CALCULATED AMOUNT)* STROKE CHANGE AMOUNT) \| |
| S47 | CURRENT TARGET DECELERATION AMOUNT = CURRENT REFERENCE DECELERATION AMOUNT |
| S48 | CURRENT TARGET DECELERATION AMOUNT = PREVIOUS TARGET DECELERATION AMOUNT |
| S50 | CURRENT TARGET DECELERATION AMOUNT = (PREVIOUS TARGET DECELERATION AMOUNT + ADDITIONAL DECELERATION AMOUNT) |

[FIG.6]
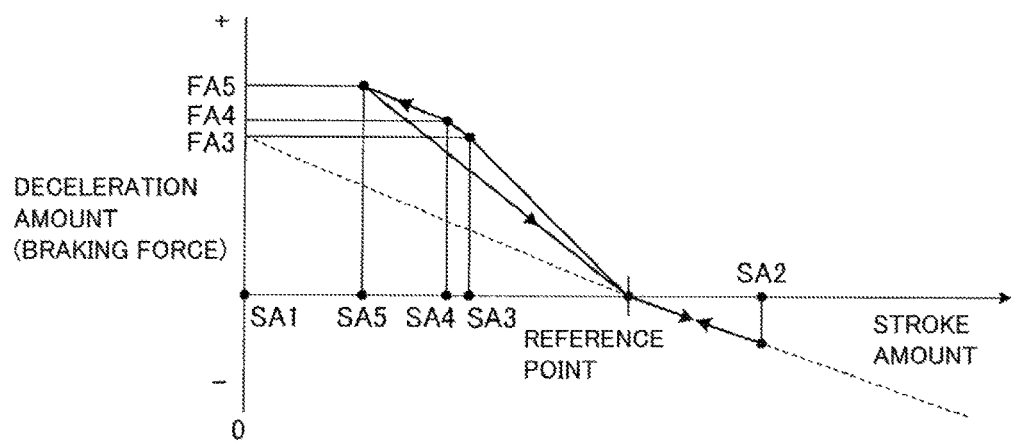
[FIG.7]
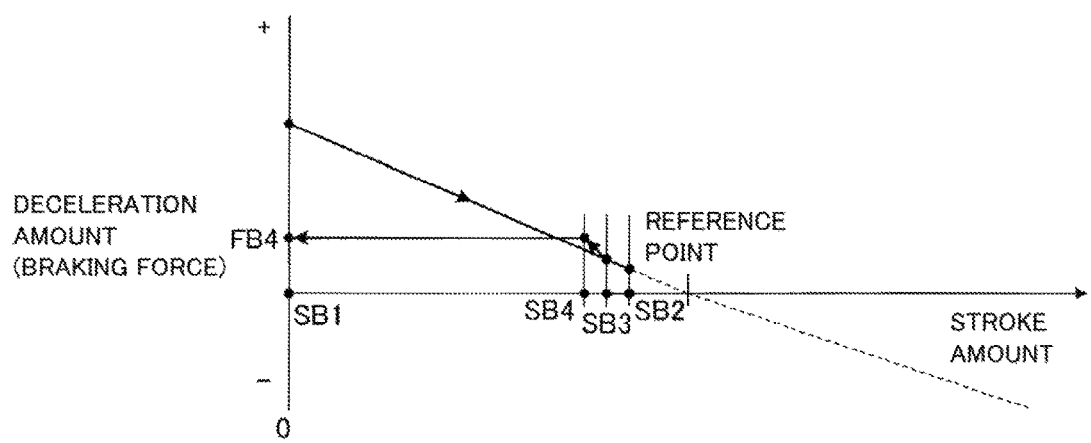

[FIG.8]
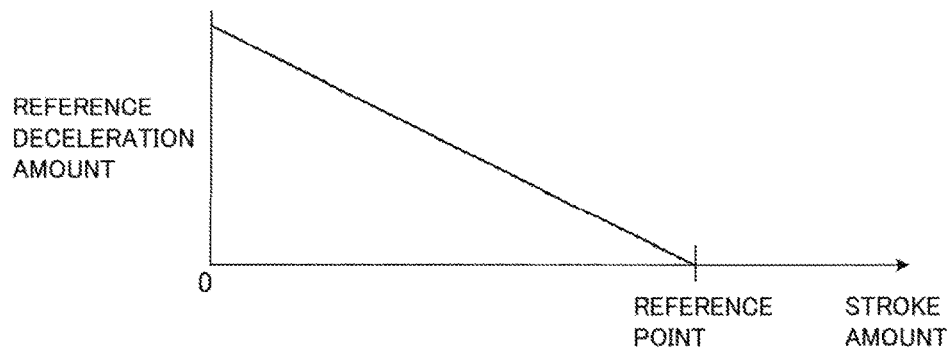
[FIG.9]
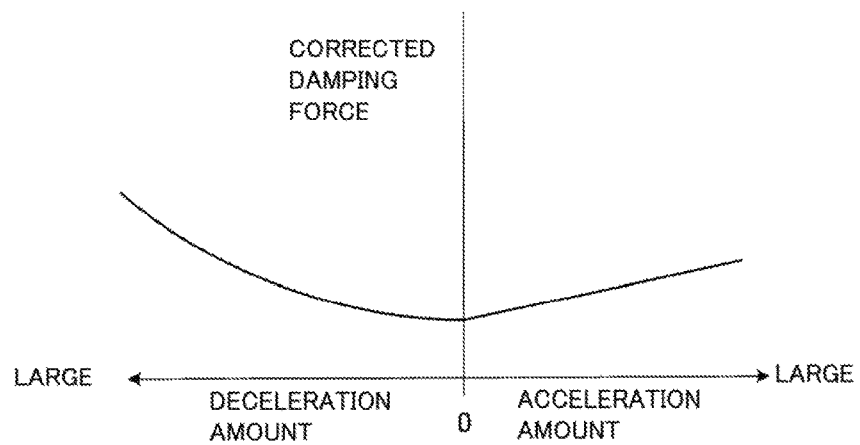

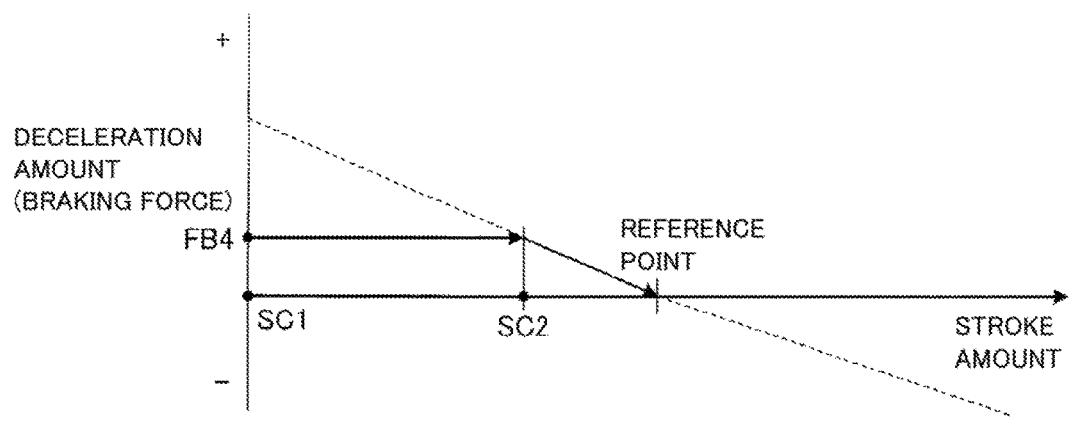
[FIG.10]

VEHICLE CONTROL DEVICE

TECHNICAL FIELD

An embodiment of the present invention relates to a vehicle control device.

BACKGROUND ART

A conventional control technique is known which gives both an acceleration pedal function and a brake pedal function to a single pedal, accelerates a vehicle when a driver steps on the single pedal from a predetermined position of the stroke of the pedal, and decelerates the vehicle when the driver cancels the stepping-on.

CITATION LIST

Patent Literature

Patent Literature 1: Japanese Unexamined Patent Application Publication No. H9-95222
Patent Literature 2: Japanese Unexamined Patent Application Publication No. 2001-219831

SUMMARY OF INVENTION

Technical Problems

However, an operation of such a conventional technique in which both acceleration and deceleration can be performed by a single pedal is different from a normal operation using a plurality of pedals. For this reason, many drivers are unaccustomed to operations of a single pedal, and operability for the drivers is desired to be improved. In particular, in adjustment of braking force, an appropriate pedal operation may not be performed, an insufficient or excessive pedal operation may be caused, and braking operability may be deteriorated.

Thus, one of the objects of the present invention is to provide a vehicle control device which can improve operability of a driver to make it possible to improve braking operability.

Solutions to the Problems

A vehicle control device according to the present invention includes, for example, a control unit which executes one-pedal control serving as control for, in a stroke of a single pedal, stepping on the pedal from a predetermined reference point to accelerate a vehicle and returning the pedal from the reference point to decelerate the vehicle; and a determination unit which determines whether a rate of change in operation amount of the pedal by the returning of the pedal is a first threshold value or more, wherein the control unit performs control for increasing braking force when the rate of change is the first threshold value or more.

In the vehicle control device according to the present invention, for example, the control unit performs control for increasing the braking force in proportion to the rate of change when the rate of change is the first threshold value or more.

In the vehicle control device according to the present invention, for example, the determination unit determines whether a rate of change in operation amount of the pedal by returning of the pedal is equal to or greater than a second threshold value larger than the first threshold value, and the control unit performs control for stopping an increase of the braking force when the rate of change is the second threshold value or more.

The vehicle control device according to the present invention further includes, for example, a suspension control unit which, in execution of the one-pedal control, performs control for increasing damping force of a suspension.

The vehicle control device according to the present invention further includes, for example, an output control unit which, at the start of the one-pedal control, outputs an announcement for drawing attention.

The vehicle control device according to the present invention further includes, for example, a lighting control unit which, at the start of the one-pedal control, lights a lamp for drawing attention of a following vehicle.

In the vehicle control device according to the present invention, for example, the damping force of the suspension is increased on the basis of the braking force.

BRIEF DESCRIPTION OF THE DRAWINGS

FIG. 1A is a diagram showing an example of a schematic configuration of a vehicle according to an embodiment.
FIG. 1B is a caption of FIG. 1A.
FIG. 2 is a block diagram showing an example of a functional configuration of a brake ECU according to the embodiment.
FIG. 3 is a diagram for explaining one-pedal control according to the embodiment.
FIG. 4 is a graph showing an example of a relationship between a rate of change in stroke amount and a deceleration amount per stroke change amount in the embodiment.
FIG. 5A is a flow chart showing an example of a procedure of a one-pedal control process according to the embodiment.
FIG. 5B is a caption of FIG. 5A.
FIG. 6 is a diagram for explaining advantages of the embodiment.
FIG. 7 is a diagram for explaining advantages of the embodiment.
FIG. 8 is a graph showing a relationship between a stroke amount during one-pedal control and a deceleration amount serving as a reference in the embodiment.
FIG. 9 is a graph showing an example of a relationship between a deceleration amount and a corrected damping force in the embodiment.
FIG. 10 is a graph showing an example of a relationship between a stroke amount and a deceleration amount in the embodiment.

DESCRIPTION OF EMBODIMENT

An illustrative embodiment of the present invention will be disclosed below. A configuration of the embodiment (described below) and an operation and a result (advantage) caused by the configuration are examples. The present invention can also be achieved by a configuration other than the configuration disclosed in the following embodiment. According to the present invention, at least one of various advantages (including derivative advantages) obtained by the configuration can be obtained.

FIG. 1A is a diagram showing an example of a schematic configuration of a vehicle according to an embodiment. In the embodiment, a vehicle 100 may be, for example, an automobile (internal-combustion engine automobile) having an internal-combustion engine (engine 20) as a drive source, an automobile (electric automobile, fuel-cell automobile, or the like) having an electric motor (motor, not shown) as a drive source, or an automobile (hybrid automobile) having both the internal-combustion engine and the electric motor as drive sources. On the vehicle 100, various transmissions can be mounted, and various devices (systems, parts, or the like) required to drive an internal-combustion engine or an electric motor can be mounted. The types, number, layouts, and the like of devices related to driving of wheels of a vehicle can be variously set. In the embodiment, as an example, the vehicle 100 is a four-wheel car (four-wheel automobile) and has two left and right front wheels FL and FR and two left and right rear wheels RL and RR. In FIG. 1A, the forward direction of longitudinal directions of the vehicle (arrow FB) is the left side.

The vehicle 100 according to the embodiment, as shown in FIG. 1A and FIG. 1B, mainly includes an engine 20, a brake control unit 30, an image-pickup device 51, a radar device 52, a brake switch 42, an accelerator pedal stroke sensor 47, a throttle position sensor 48, a longitudinal direction acceleration sensor 43, a control device 40, a loudspeaker 95, and a hazard lamp 96.

The vehicle 100 includes wheel cylinders Wfr and Wfl, vehicle wheel speed sensors 41*fr* and 41*fl*, and suspensions (suspension devices) 9*fr* and 9*fl* in response to the two front wheels FR and FL, respectively. The vehicle 100 includes wheel cylinders Wrr and Wrl, vehicle wheel speed sensors 41*rr* and 41*rl*, and suspensions (suspension devices) 9*rr* and 9*rl* in response to the two rear wheels RR and RL, respectively.

The suspensions 9*fr*, 9*fl*, 9*rr*, and 9*rl* are interposed between the vehicle wheels FR, FL, RR, and RL and a vehicle body (not shown) to suppress vibration or shock from a road surface from being transmitted to the vehicle body. In the embodiment, for example, the suspensions 9*fr*, 9*fl*, 9*rr*, and 9*rl* include shock absorbers 91*fr*, 91*fl*, 91*rr*, and 91*rl*, and actuators 92*fr*, 92*fl*, 92*rr*, and 92*rl*, respectively. The shock absorbers 91*fr*, 91*fl*, 91*rr*, and 91*rl* have damping characteristics which can be electrically controlled (adjusted). The actuators 92*fr*, 92*fl*, 92*rr*, and 92*rl* change the damping characteristics of the shock absorbers 91*fr*, 91*fl*, 91*rr*, and 91*rl*, respectively, by a command signal from a suspension ECU 14 to be described below.

The vehicle 100 includes, in addition to the constituent elements in FIG. 1A, basic constituent elements as the vehicle 100. However, only components related to the vehicle 100 and control related to the components will be described here.

Hereinafter as necessary, the vehicle wheel speed sensors 41*fr*, 41*fl*, 41*rr*, and 41*rl* are collectively referred to as "vehicle wheel speed sensors 41"; the wheel cylinders Wfr, Wfl, Wrr, and Wrl are collectively referred to as "wheel cylinders W"; the suspensions 9*fr*, 9*fl*, 9*rr*, and 9*rl* are collectively referred to as "suspensions 9"; the shock absorbers 91*fr*, 91*fl*, 91*rr*, and 91*rl* are collectively referred to as "shock absorbers 91"; and the actuators 92*fr*, 92*fl*, 92*rr*, and 92*rl* are collectively referred to as "actuators 92".

The image-pickup device 51 is, for example, a digital camera including an image pickup element such as a CCD (Charge Coupled Device) or a CIS (CMOS Image Sensor) built therein. The image-pickup device 51 can output image data (video data or frame data) at a predetermined frame rate. In the embodiment, the image-pickup device 51, for example, is located at an end part (end part when planarly viewed) on the front side (forward side in the longitudinal directions of a vehicle) of a vehicle body (not shown) and disposed on a front bumper or the like. The image-pickup device 51 outputs image data including an object to be avoided such as a leading vehicle 501 or the like in front of the vehicle 100.

The radar device 52 is, for example, a millimeter wave radar device. The radar device 52 can output distance data representing a distance (separation distance or detection distance) to the object to be avoided such as the leading vehicle 501, speed data representing a relative speed (speed) to the object to be avoided, and the like. The control device 40 updates a measurement result of a distance between the vehicle 100 and the object to be avoided such as the leading vehicle 501 by the radar device 52 from time to time (for example, at predetermined time intervals or the like) and stores the measurement result in a storage unit, and can use the updated distance measurement result in an arithmetic operation. The vehicle 100 can include a sonar device to detect the object to be avoided.

The vehicle wheel sensors 41 output signals having pulses each time the vehicle wheels corresponding to the vehicle wheel sensors 41 rotate at predetermined angles.

In the embodiment, a brake pedal BP is a pedal to brake the vehicle 100 when a driver steps on the brake pedal. However, an accelerator pedal AP is also used to brake the vehicle 100. More specifically, when the driver steps on the accelerator pedal AP from a predetermined reference point of the stroke of the accelerator pedal AP, the vehicle 100 is accelerated; and when the driver returns the accelerator pedal AP from the reference point, the vehicle 100 is braked and then decelerated. More specifically, the accelerator pedal AP is used in both acceleration and deceleration of the vehicle 100.

The accelerator pedal stroke sensor 47 is disposed on the accelerator pedal AP and detects a step-on amount (stroke amount) of the accelerator pedal AP operated by the driver. The throttle position sensor 48 detects a throttle position changing with stepping-on of the accelerator pedal AP by the driver.

The brake switch 42 is disposed on the brake pedal BP and outputs a brake operation signal representing the presence/absence of the operation of the brake pedal BP by the driver. More specifically, the brake switch 42 outputs an ON (High) brake operation signal when the brake pedal BP is operated and outputs an off (Low) brake operation signal when the brake pedal BP is not operated.

The longitudinal direction acceleration sensor 43 detects an acceleration (forward/backward acceleration) in the longitudinal direction of the vehicle body to output a signal representing the forward/backward acceleration.

The engine 20 outputs power depending on an operation of the accelerator pedal AP by the driver. The brake control unit 30 generates braking force through brake fluid pressures on the vehicle wheels FR, FL, RR, and RL by a command from the brake ECU 12. The brake control unit 30 generates a brake fluid pressure depending on operation force acting on the brake pedal BP and can adjust brake fluid pressures supplied to the wheel cylinders Wfr, Wfl, Wrr, and Wrl disposed on the vehicle wheels FR, FL, RR, and RL, respectively.

More specifically, the brake control unit 30 includes a master cylinder which generates a master cylinder fluid pressure depending on an operation of the brake pedal BP by the driver, a pressurization pump which can generate a pressurizing fluid pressure to generate a high fluid pressure higher than the master cylinder fluid pressure, and a linear electromagnetic valve which uses a pressurizing fluid generated by the pressurization pump to make it possible to adjust a pressurization amount (differential pressure) to the master cylinder fluid pressure (any of these components are not shown). In order to perform avoidance braking by a command from the brake ECU 12, the brake control unit 30 controls the pressurization pump and the linear electromagnetic valve to adjust a pressurization amount. The brake control unit 30 supplies a fluid pressure obtained by adding the pressurization amount to a master cylinder fluid pressure generated by the avoidance braking to the wheel cylinders Wfr, Wfl, Wrr, and Wrl as brake fluid pressures to control fluid pressure braking force so as to give braking force to the vehicle 100 independently of braking performed by an operation of the brake pedal BP.

The control device 40 receives signals, data, and the like from the parts of the vehicle 100 and executes control of the parts of the vehicle 100. The control device 40, as shown in FIG. 1A and FIG. 1B, mainly includes a brake ECU (Electronic Control Unit) 12, an engine ECU 13, the suspension ECU 14, an output control unit 15, and a lighting control unit 16. In the embodiment, the control device 40 is an example of the vehicle control device.

The engine ECU 13 manages various controls of the engine 20 such as fuel injection control and air-intake adjustment control.

The brake ECU 12 manages, for example, adjustment control of a braking torque to its own vehicle, and adjustment control of a braking torque of each of the vehicle wheels FR, FL, RR, and RL. The brake ECU 12 calculates a vehicle body speed of its own vehicle on the basis of a detection signal from at least one vehicle wheel sensor 41 of the vehicle wheel sensors 41 respectively disposed on the vehicle wheels FR, FL, RR, and RL, calculates a deceleration or the like of its own vehicle on the basis of a detection signal from the longitudinal direction acceleration sensor 43, and sends the speed and the deceleration or the like to another ECU. The "deceleration" calculated here is a positive value when its own vehicle is decelerated and is a negative value when its own vehicle is accelerated.

In this embodiment, by the engine ECU 13 and the brake ECU 12, the vehicle 100 is controlled to be accelerated when the driver steps on the accelerator pedal AP from a predetermined reference point in the stroke of the accelerator pedal AP, and the vehicle 100 is controlled to be decelerated when the driver returns the accelerator pedal AP from the reference point. The control is called one-pedal control. The one-pedal control will be described later in detail.

The suspension ECU 14 sends command signals to the actuators 92 of the suspensions 9 to change the damping characteristics of the shock absorbers 91 so as to make it possible to control the damping characteristics of the four vehicle wheels FR, FL, RR, and RL. The suspension ECU 14 can control the vehicle wheels FR, FL, RR, and RL such that the damping characteristics of the vehicle wheels FR, FL, RR, and RL are different from each other. In the embodiment, the suspension ECU 14 can send a command for increasing damping forces to the actuators 92 during the one-pedal control. In this manner, during the one-pedal control, the damping forces of the suspensions 9 are increased.

The output control unit 15 controls various voice outputs to the loudspeaker 95 disposed inside the vehicle 100. In the embodiment, the output control unit 15, at the start of one-pedal control, outputs an announcement representing the start of one-pedal control to the loudspeaker 95 to draw attention.

The lighting control unit 16 controls lightning of the hazard lamp 96 disposed on the rear part of the vehicle body. In the embodiment, the lighting control unit 16, at the start of one-pedal control, lights the hazard lamp 96 to draw attention of the following vehicle.

The ECUs, the output control unit 15, and the lighting control unit 16 are configured as computers, and include arithmetic processing units (not shown) such as CPUs (Central Processing Units) and storage units (storage unit 65 in the brake ECU 12) such as ROMs (Read Only Memories), RAMs (Random Access Memories), or flash memories.

The arithmetic processing unit reads a program stored (installed) in a nonvolatile storage unit (for example, ROM, flash memory, or the like), executes arithmetic processing according to the program, and functions as each ECU. In particular, the brake ECU 12 functions (operates) as each unit shown in FIG. 2 (will be described later). In the storage unit, data (table (data group), function, or the like) used in various arithmetic operations related to control, an arithmetic operation result (also including a value obtained during an arithmetic operation), and the like can be stored.

The configuration of the vehicle 100 described above is merely an example and can be effected by being variously changed. As devices configuring the vehicle 100, known devices can be used. Each of the components of the vehicle 100 can be shared by another component.

The brake ECU 12 will be described below in detail. FIG. 2 is a block diagram showing an example of a functional configuration of the brake ECU 12 according to the embodiment. The brake ECU 12 can function (operate) as a determination unit 122, a control unit 123, and a storage unit 125 in conjunction with hardware and software (program) as shown in FIG. 2. More specifically, the program can include, as an example, modules corresponding to the blocks of the determination unit 122 and the control unit 123 shown in FIG. 2. Various threshold values and various flags (will be described later) are stored in the storage unit 125.

The control unit 123 executes one-pedal control, for example, when one-pedal control is selected by a command of a driver operating a selecting switch or the like (not shown), or when in-traffic-jam is determined on the basis of a following distance and a traveling speed detected by the image-pickup device 51 and the radar device 52, or the like. FIG. 3 is a diagram for explaining one-pedal control according to the embodiment. In FIG. 3, the abscissa shows a stroke amount of the accelerator pedal AP, and the ordinate shows a driving force calculated by the engine ECU 13 and the brake ECU 12.

As shown in FIG. 3, in a range of a stroke amount (range equal to or larger than a reference point) in which the driver steps on the accelerator pedal AP over the reference point, an acceleration/deceleration amount is positive, and the engine ECU 13 accelerates the vehicle 100 at an acceleration amount depending on the stroke amount.

On the other hand, in a range of a stroke amount (range from 0 to a reference point) in which the driver returns the accelerator pedal AP from the reference point, an acceleration amount becomes negative. The brake ECU 12 calculates a deceleration amount which is negative acceleration force and becomes a positive value to give braking force depending on the deceleration amount to the vehicle 100. The acceleration amount and the deceleration amount will be described below as values, the signs of which are opposite to each other.

In this manner, in the embodiment, by using only the accelerator pedal AP, acceleration and deceleration (braking) of the vehicle 100 can be controlled. For this reason, the brake pedal BP and the accelerator pedal AP can be prevented from being erroneously stepped on. In this case, the reference point can be arbitrarily set, and the position of the reference point is stored in the storage unit 125 in advance.

The embodiment has the following functions on the assumption that the one-pedal control as described above is executed.

With reference back to FIG. 2, the determination unit 122, every predetermined time, stroke amounts of the accelerator pedal AP are sequentially acquired from the accelerator pedal stroke sensor 47. In this case, the stroke amount of the accelerator pedal AP is an example of the pedal operation amount.

The determination unit 122 calculates a stroke change amount from a difference between a previous stroke amount and a current stroke amount and calculates a rate of change in stroke amount from the stroke change amount and an interval (predetermined time) at which the stroke change amount is acquired. The rate of change in stroke may be designed to be calculated on the basis of a plurality of past rates of change in stroke and a result of the stroke change amount.

The control unit 123 determines whether the accelerator pedal AP is returned by the driver at a point where the stroke amount of the accelerator pedal AP is smaller than the reference point (return side). When the accelerator pedal is returned before the reference point, the control unit 123 calculates a deceleration amount on the return side on the basis of the rate of change in stroke change amount.

When a rate of change in stroke amount obtained by returning the accelerator pedal AP is smaller than a first threshold value, the control unit 123 performs control to obtain a reference deceleration amount depending on a stroke. When the rate of change in stroke amount obtained by returning the accelerator pedal AP is the first threshold value or more, i.e., when the driver quickly returns the accelerator pedal AP, the control unit 123 performs control to make a deceleration amount larger than that obtained when the rate of change in stroke amount is smaller than the first threshold value. In this case, the control unit 123 largely increases the deceleration amount in proportion to the rate of change in stroke amount. More specifically, the control unit 123 sends a command to the brake control unit 30 to increase the deceleration amount by a value being proportional to the rate of change in stroke amount. When the deceleration amount is increased, braking force given depending on the deceleration amount also increases.

In this manner, when the driver quickly returns the accelerator pedal AP, braking force larger than braking force obtained when the accelerator pedal AP is slowly returned is given to the vehicle 100. For this reason, when the driver wants to give large braking force, the driver only needs to return the accelerator pedal AP quickly. For this reason, even in the event that a driver is not accustomed to performing the one-pedal control which achieves both acceleration and deceleration by a single pedal, since a magnitude of braking force can be changed by a speed of returning of the accelerator pedal AP, the operability can be improved, the braking force can be prevented from being late, and braking controllability can be improved.

The control unit 123 performs control to stop an increase in braking force when the rate of change in stroke amount obtained when the accelerator pedal AP is returned is the second threshold value or more, i.e., when the accelerator pedal AP is very quickly returned.

When a driver steps on the accelerator pedal AP with her/his foot, the driver may erroneously slip from the accelerator pedal AP. In this manner, when the foot stepping on the accelerator pedal AP quickly slips from the accelerator pedal AP, the driver very quickly returns the accelerator pedal AP. As described above, when the speed of returning of the accelerator pedal AP is high, a rate of change in stroke amount by returning is the first threshold value or more, and braking force stronger than that obtained when the accelerator pedal AP is slowly returned is given. Thus, very strong braking force is disadvantageously given to the vehicle 100.

For this reason, in the embodiment, as in a case in which a foot stepping on the accelerator pedal AP is quickly slipped from the pedal, when the accelerator pedal AP is very quickly returned, i.e., when a rate of change in stroke amount by pedal returning is a second threshold value or more, the deceleration amount is not increased in proportion to the rate of change, and the deceleration amount is maintained even though the stroke amount of the accelerator pedal AP changes on the return side. When the deceleration amount is maintained, braking force given depending on the deceleration amount is also maintained. In this manner, the braking force is prevented from being excessively given.

FIG. 4 is a graph showing an example of a relationship, which is used by the control unit 123 when a deceleration amount in pedal returning in the one-pedal control according to the embodiment, between a rate of change in stroke amount and a deceleration amount per stroke change amount. In FIG. 4, the abscissa shows an absolute value of a rate of change in stroke amount of returning of the accelerator pedal AP, and the ordinate shows a deceleration amount per stroke amount. The pedal returning is on a side on which the stroke amount decreases and a side on which a rate of change decreases (negative). Since a magnitude relation and a speed relation are opposite to each other, the abscissa is shown as the absolute value of the rate of change to make it easy to understand the graph. As shown in FIG. 4, when the rate of change in stroke amount of the accelerator pedal AP by returning is high and equal to or larger than the first threshold value, it is understood that, with respect to the absolute value of the rate of change in stroke amount by the pedal returning, in proportion to a speed by which the rate of change is larger than the first threshold value, the deceleration amount per stroke change amount increases. As shown in FIG. 4, when the rate of change in stroke amount of the accelerator pedal AP is higher and equal to or larger than the second threshold value, it is understood that the deceleration amount per stroke change amount is limited to zero.

A one-pedal control process by the control device 40 according to the embodiment configured as described above will be described in a series of flows. FIG. 5A is a flow chart showing an example of a procedure of a one-pedal control process according to the embodiment. The process in FIG. 5A and FIG. 5B is repeatedly executed at a predetermined arithmetic operation cycle. Also in the process performed during the one-pedal control, a control process on an acceleration side on which the accelerator pedal AP is stepped on from the reference point and an arithmetic operation process on a step-on side will be described only when needed.

The control unit 123 starts the one-pedal control to determine whether in-one-pedal-control is set (S11). For example, when a driver operates a selecting switch or the like (not shown) to select the one-pedal control or when the driver determines in-traffic-jam on the basis of a following distance and a traveling speed detected by the image-pickup device 51 and the radar device 52, the control unit 123 confirms that the vehicle is in a stop state and that the accelerator pedal AP is not being stepped on (stroke amount is 0), starts the in-one-pedal-control (S11, Yes). On the other hand, the control unit 123 ends the one-pedal control when the driver operates the selecting switch or the like (not shown) to request cancellation of the one-pedal control, when in-traffic-jam is not determined on the basis of a following distance and a traveling speed detected by the image-pickup device 51 and the radar device 52, or the like (S11: No).

When the one-pedal control is started (S12: No), the control unit 123 sets, for initial setting, a deceleration amount obtained when the stroke amount of a reference deceleration amount shown in FIG. 8 as a start deceleration amount is 0 as a previous target deceleration amount. FIG. 8 is a graph showing a relation of a reference deceleration amount to the stroke amount during one-pedal control, and is a graph showing a negative acceleration amount from a zero stroke amount in FIG. 3 to the reference point as a positive deceleration amount. Similarly, the control unit 123 sets a start stroke amount (=0) as the previous stroke amount. Furthermore, the control unit 123 designates an output designation unit 15 to draw attention, and the output designation unit 15 outputs to the loudspeaker 95 an announcement for drawing attention (S14). The control unit 123 may designate the lighting control unit 16 to draw attention of a following vehicle to flicker the hazard lamp 96, for example, a predetermined number of times. When the one-pedal control is to be ended, (S11: No, S26: Yes) the control unit 123 may designate the output unit 15 to output an announcement of the end of one-pedal control to the loudspeaker 95 (S27).

The determination unit 122 acquires a current stroke amount of the accelerator pedal AP from the accelerator pedal stroke sensor 47 (S15). The determination unit 122 subtracts the current stroke amount from the previous stroke amount to calculate a stroke change amount (S16). Furthermore, on the basis of the calculated stroke change amount and an elapsed time from when the previous stroke amount is acquired, i.e., an arithmetic operation cycle, a rate of change in stroke amount by pedal returning is calculated (S17).

The control unit 123 determines whether the current stroke value is the reference point or less (S18). When the stroke value is larger than the reference point (S18: No), control on an acceleration side is performed (S29), and the control unit 123 sets 0 as a current target deceleration amount (S30). When the current stroke amount is the reference point or less (S18: Yes), the control unit 123 determines that the pedal is being returned when the stroke change amount is negative or when the rate of change in stroke amount is negative (S19: Yes), the control unit 123 performs the process on the pedal returning side. On the other hand, when it is not determined that the pedal is being returned (S19: No), the control unit 123 performs the process on the stepping-on side.

When it is determined that the pedal is being returned, the control unit 123 calculates a deceleration amount in pedal returning as a current target deceleration amount as the process on the returning side. First, the control unit 123 calculates an absolute value of a rate of change in stroke, and calculates a deceleration amount FK per stroke change amount on the basis of a relationship between an absolute value of a stroke change amount shown in FIG. 4 and a deceleration amount per stroke change amount (S20). A value obtained by multiplying the deceleration amount FK per stroke change amount by the stroke change amount is converted into an absolute value to calculate an additional deceleration amount (S21). The additional deceleration amount is added to the previous target deceleration amount to calculate a current target deceleration amount (S50).

In a region in which a rate of change in stroke amount is smaller than the first threshold value in FIG. 4, the deceleration amount FK per stroke change amount is set to a value which achieves a reference deceleration amount to a stroke amount in one pedal-control shown in FIG. 8. For example, when the accelerator pedal AP is returned from the reference point in a state in which the absolute value of the rate of change in stroke is considerably smaller than the first threshold value, the calculated additional deceleration amount is added to braking force which is 0 at the reference point at an arithmetic operation cycle to make current target braking force the reference deceleration amount to the stroke amount during the one-pedal control shown in FIG. 8.

On the other hand, in FIG. 4, in a region in which the absolute value of the rate of change in stroke amount by pedal returning is the predetermined first threshold value or more and it is determined that the accelerator pedal AP is quickly returned by a driver, the deceleration amount FK per stroke change amount is set to be larger than that in the region in which the absolute value is smaller than the first threshold value. In particular, in FIG. 4, with respect to the absolute value of the rate of change in stroke amount by pedal returning, the deceleration amount FK per stroke change amount is set to increase in proportion to a speed by which the absolute value is larger than the first threshold value. In this manner, when the accelerator pedal AP is quickly returned to make the absolute value of the rate of change in stroke amount equal to or larger than the first threshold value, i.e., when the accelerator pedal AP is returned at a speed higher than the first threshold value, the deceleration amount is set such that the deceleration amount increases at an inclination sharper than a change inclination of a deceleration amount serving as a reference to the stroke amount during the one-pedal control shown in FIG. 8.

Furthermore, in FIG. 4, in a region in which the absolute value of the rate of change in stroke amount of the accelerator pedal AP by pedal returning of the accelerator pedal AP is the second threshold value or more and it is determined that the accelerator pedal AP is further quickly returned and is slipped up, the deceleration amount FK per stroke change amount is set to be 0. In this manner, when the accelerator pedal AP is further quickly returned to make the absolute value of the rate of change in stroke amount equal to or larger than the second threshold value, i.e., when the accelerator pedal AP is slipped up and returned at a speed higher than the second threshold value, regardless of the stroke change amount, the additional deceleration amount is calculated as 0, and the current target deceleration amount is kept at a value equal to the previous target deceleration amount.

The control unit 123 outputs braking force depending on a target braking amount by using the brake control unit 30 (S22). Furthermore, the control unit 123 transmits a corrected damping force calculated from a relationship between, for example, a deceleration amount shown in FIG. 9 and a corrected damping force to the suspension ECU 14 (S23), and the suspension ECU 14 adds the corrected damping force to normal damping force to make the damping force of the suspensions stronger than the normal damping force. Alternatively, the relationship shown in FIG. 9 may be given to the suspension ECU 14 side, and the control unit 123 may transmit the in-one-pedal-control and the target braking amount to the suspension ECU 14. As on the acceleration side of one-pedal control, the damping force of the suspensions may be increased depending on an acceleration amount as shown in, for example, FIG. 9 (S30).

After the processes (S20 to S23) in the current pedal-returning are finished, the control unit 123, in preparation for the next arithmetic operation, sets the current target deceleration amount as the previous target deceleration amount (S25), sets a current stroke amount as a previous stroke amount, sets whether the current in-one-pedal-control has been set as a previous in-one-pedal-control state (S25) to end the process.

In this manner, in the embodiment, the control unit 123 of the brake ECU 12 increases braking force in proportion to a rate of change in stroke amount when a rate of change in stroke amount by returning the accelerator pedal AP is the first threshold value or more, i.e., the accelerator pedal AP is quickly returned by a driver. In this manner, according to the embodiment, when the driver quickly returns the accelerator pedal AP, braking force stronger than braking force acting when the accelerator pedal AP is slowly returned is given to the vehicle 100. For this reason, in the embodiment, even though a driver is not accustomed to performing one-pedal control which achieves both acceleration and deceleration with a single pedal, the magnitude of braking force can be changed by changing only the speed of returning of the accelerator pedal AP. Thus, according to the embodiment, operability can be improved, braking force can be prevented from being late, and braking controllability can be improved.

This will be described with reference to an example shown in FIG. 6. In FIG. 6, the abscissa shows a stroke amount, and the ordinate shows a braking amount. When a driver quickly returns the pedal from a stroke amount SA2 in the acceleration region to return the pedal at a rate of change in stroke amount higher than the first threshold value shown in FIG. 4A from the reference point until the stroke amount reaches a stroke amount SA3, with respect to a decrease in stroke amount, the deceleration amount is increased at an increase inclination higher than an increase inclination of the deceleration amount serving as a reference to a normal stroke amount indicated by a broken line, and a braking amount depending on the deceleration amount is also increased. After the stroke amount exceeds the stroke amount SA3, when the driver quickly decreases the returning speed, the increase inclination of the deceleration amount also decreases. After the returning speed is lower than the first threshold value at a stroke amount SA4, an inclination of an increase in braking amount with respect to a decrease in stroke amount in pedal returning is almost equal to a normal inclination. In FIG. 6, after the pedal is returned until the stroke amount reaches a stroke amount SA5, the accelerator pedal AP is stepped on up to the acceleration region again. In this manner, when the acceleration pedal is stepped on from a state in which a deceleration amount larger than the deceleration amount serving as the reference to the stroke amount, the braking amount is continuously decreased with respect to the change in stroke amount such that the braking amount is 0 at the reference point. In the example in FIG. 6, the deceleration amount is decreased from the deceleration amount at the start of stepping-on according to a predetermined decrease inclination at which the deceleration amount is 0 at the reference point.

In the embodiment, the control unit of the brake ECU 12 stops the increase in braking force when the absolute value of the rate of change in stroke amount by returning the accelerator pedal AP is the second threshold value or more, i.e., when the accelerator pedal AP is very quickly returned at a speed equal to or higher than the second threshold value. For this reason, according to the embodiment, even though a foot stepping on the accelerator pedal AP is quickly slipped up, i.e., even though the accelerator pedal AP is very quickly returned, since the braking force is maintained, excessive braking force is prevented from being given.

This will be described with reference to an example shown in FIG. 7. In FIG. 7, the abscissa shows a stroke amount, and the ordinate shows a braking amount. It is assumed that a driver slips up the accelerator pedal AP at the stroke amount SB2 while the driver steps on the accelerator pedal AP at the stroke amount SB1 toward the acceleration region. The brake pedal AP slipped up begins to be quickly returned, and the braking force increases accordingly. In this case, until the stroke amount reaches the stroke amount SB3 at which the rate of change in stroke is lower than a first reference value, the deceleration amount is increased with respect to a decrease in stroke amount according to a deceleration amount serving as a reference to a normal stroke amount indicated by a broken line. When the rate of change in stroke reaches the first threshold value at the stroke amount SB3 and when the rate of change in stroke amount further increases, the deceleration amount is quickly increased at an increase inclination higher than an inclination of an increase in deceleration amount serving as the normal stroke amount indicated by the broken line. However, after the rate of change in stroke amount has reached the second threshold value at the stroke amount SB4, the inclination of an increase in braking amount with respect to a decrease in stroke amount is 0. For this reason, the deceleration amount is kept without increasing to an amount equal to or larger than a braking amount FB4 at the stroke amount SB4, and braking force given depending on the deceleration amount is also kept. In this manner, when the acceleration pedal is stepped on from a state in which a deceleration amount larger than the deceleration amount serving as the reference to the stroke amount is set, the deceleration amount may be decreased according to a predetermined decrease inclination such that the deceleration amount decreases from the deceleration amount at the start of stepping-on and becomes 0 at the reference point. Alternatively, as shown in FIG. 10, while the deceleration amount is smaller than the deceleration amount serving as a reference to a stroke amount, the deceleration amount at the start of stepping-on is kept. After the the deceleration amount kept at the stroke amount SC2 by an increase in stroke amount by stepping-on is equal to or larger than the deceleration amount serving as the reference to the stroke amount, the deceleration amount may be decreased according to the deceleration amount serving as a reference to a stroke amount indicated by a broken line such that the deceleration amount becomes 0 at the reference point.

When a driver is not accustomed to performing acceleration and deceleration by stepping on the single accelerator pedal AP, it may be difficult for the driver to perform fine braking control. In such a case, braking force to be given to the vehicle 100 excessively varies, an attitude change of the vehicle 100 by the variation in braking force may make an occupant of the vehicle 100 feel uncomfortable, or a pedal operation may become difficult. In the embodiment, since, in execution of one-pedal control, the suspension ECU 14 performs control to increase damping force of the suspensions 9, the attitude change of the vehicle 100 caused by the variation in braking force is suppressed to make it possible to improve the comfortability of the occupant of the vehicle 100 and improve the operability the vehicle 100.

In the embodiment, when execution of one-pedal control is started, the output control unit 15 outputs an announcement for the execution of one-pedal control to the loudspeaker 95 to draw attention. The occupant of the vehicle 100 can know in advance that the braking force may be varied by the one-pedal control. This is advantageous to the occupant.

In the embodiment, as the operation amount of the accelerator pedal AP, a stroke amount detected by the accelerator pedal stroke sensor 47 is used. However, the operation amount is not limited to the stroke amount, and any detectable operation amount of the accelerator pedal AP may be used. For example, a throttle position detected by the throttle position sensor 48 can also be used as the operation amount of the accelerator pedal AP.

In the embodiment, the first threshold value and the second threshold value are determined in advance. However, in control, a state of a traveling road such as a slope may be detected, and the first threshold value and the second threshold value may be dynamically changed depending on the detected state of the traveling road. A state of a traffic jam, an ON/OFF state of a signal light, and the like may be acquired from the outside, and the first threshold value and the second threshold value may be dynamically changed depending on the acquired states.

Although the several embodiments of the present invention have been described above, the embodiments have been presented as examples, and do not intend to limit the spirit and scope of the invention. The embodiment can be carried out in other various modes, and various omissions, replacements, and changes of the invention can be made without departing from the spirit and scope of the invention. The embodiments and modifications thereof are included in the spirit and scope of the invention and the summary of the invention, and included in the invention described in the claims and the range of equivalency of the claims.

The invention claimed is:

1. A vehicle control device comprising:
a control processor configured to:
execute one-pedal control serving as control for, in a stroke of a single pedal, stepping on the single pedal from a predetermined reference point to accelerate a vehicle and returning the single pedal from the predetermined reference point to decelerate the vehicle;
determine whether a rate of change in operation amount of the single pedal by the returning of the single pedal is a first threshold value or more;
determine whether a rate of change in operation amount of the pedal by returning the pedal is equal to or greater than a second threshold value which is greater than the first threshold value;
perform control for increasing braking force when the rate of change is the first threshold value or is between the first threshold and the second threshold; and
perform control for stopping an increase of the braking force when the rate of change is the second threshold value or more.

2. The vehicle control device according to claim 1, wherein the control processor performs control for increasing the braking force in proportion to the rate of change when the rate of change is the first threshold value or is between the first threshold and the second threshold.

3. The vehicle control device according to claim 2, further comprising a suspension control processor which, in execution of the one-pedal control, performs control for increasing damping force of a suspension.

4. The vehicle control device according to claim 2, further comprising an output control processor which, at a start of the one-pedal control, outputs an announcement for drawing attention.

5. The vehicle control device according to claim 2, further comprising a lighting control processor which, at a start of the one-pedal control, lights a lamp for drawing attention of a following vehicle.

6. The vehicle control device according to claim 1, further comprising a suspension control processor which, in execution of the one-pedal control, performs control for increasing damping force of a suspension.

7. The vehicle control device according to claim 6, wherein the damping force of the suspension is increased on a basis of the braking force.

8. The vehicle control device according to claim 7, wherein the control processor performs control for increasing the braking force in proportion to the rate of change when the rate of change is the first threshold value or more.

9. The vehicle control device according to claim 6, further comprising an output control unit processor, at a start of the one-pedal control, outputs an announcement for drawing attention.

10. The vehicle control device according to claim 6, further comprising a lighting control processor which, at a start of the one-pedal control, lights a lamp for drawing attention of a following vehicle.

11. The vehicle control device according to claim 1, further comprising an output control processor which, at a start of the one-pedal control, outputs an announcement for drawing attention.

12. The vehicle control device according to claim 1, further comprising a suspension control processor which, in execution of the one-pedal control, performs control for increasing damping force of a suspension.

13. The vehicle control device according to claim 1, further comprising a lighting control processor which, at a start of the one-pedal control, lights a lamp for drawing attention of a following vehicle.

* * * * *